UNITED STATES PATENT OFFICE.

MARCUS BENJAMIN SACKS, OF PHILADELPHIA, PENNSYLVANIA.

FURNITURE-POLISH COMPOSITION.

1,359,536.  Specification of Letters Patent.  Patented Nov. 23, 1920.

No Drawing.  Application filed March 29, 1920. Serial No. 369,545.

*To all whom it may concern:*

Be it known that I, MARCUS BENJAMIN SACKS, a citizen of the United States of America, residing at 2407 Ridge avenue, Philadelphia, county of Philadelphia, State of Pennsylvania, have invented a new and useful Furniture-Polish Composition, of which the following is a specification.

The object of my invention is the production of a furniture polish composition, to be applied to the surfaces of all kinds of wood-work, for the purpose of cleaning, polishing, restoring and renewing same.

My composition consists of a mixture of linseed oil, (boiled,) turpentine and vinegar. In the preparation of the composition, I prefer to use the ingredients in about the following proportions, to wit: 1 gallon of linseed oil, (boiled), 1 pint of turpentine, 1 quart of vinegar.

The linseed oil is first boiled and allowed to cool, and the other two ingredients are then mixed with same, and the composition is then ready for use.

My composition is thus made up of all pure ingredients, which will positively not harm the finest wood, and at the same time, consumes the dirt, cleansing the wood, and producing the best possible results in the way of a clear bright polish and a renewed surface of the wood-work.

I claim:

A liquid composition of matter, consisting of linseed oil (boiled), turpentine and vinegar, for the purpose of producing a polish on all decorative woods, and mixed in the following proportions to wit: one gallon linseed oil (boiled), one pint of turpentine and one quart of vinegar.

MARCUS BENJAMIN SACKS.